UNITED STATES PATENT OFFICE.

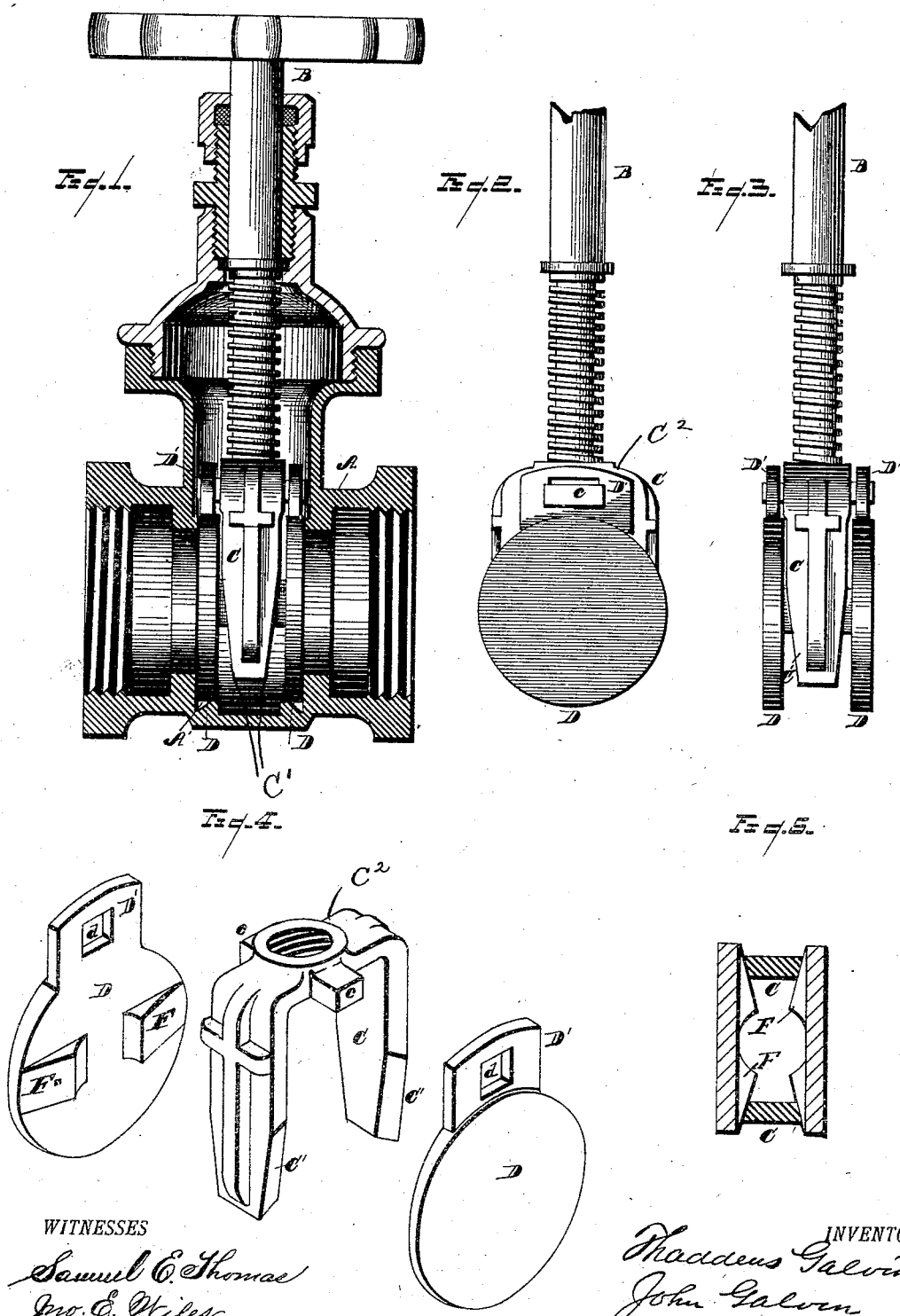

THADDEUS GALVIN AND JOHN GALVIN, OF DETROIT, MICHIGAN.

VALVE.

SPECIFICATION forming part of Letters Patent No. 321,807, dated July 7, 1885.

Application filed April 13, 1885. (No model.)

*To all whom it may concern:*

Be it known that we, THADDEUS GALVIN and JOHN GALVIN, of Detroit, county of Wayne, State of Michigan, have invented a new and useful Improvement in Valves; and we declare the following to be a full, clear, and exact description of the same, such as will enable others skilled in the art to which it pertains to make and use it, reference being had to the accompanying drawings, which form a part of this specification.

Our invention consists of the combinations of devices and appliances hereinafter specified, and more particularly pointed out in the claim.

Our invention relates more particularly to the yoke through which the valve-stem is tapped and the valve disk or plates which close against the valve-seats.

In the drawings, Figure 1 is a view partly in elevation and partly in section, illustrating our invention. Fig. 2 is a separate front view, and Fig. 3 a separate side elevation, of the valve when removed from its case. Fig. 4 shows the valve mechanism with the disks separated from the lugs, although it should be borne in mind that in practice the lugs are slightly rivet-headed to prevent the disk being so removed. Fig. 5 is a cross section through the middle of the disks at right angles to the valve-stem.

A represents a valve-case; A', its valve-seats. B is the valve-stem, D the disks, and C the yoke. The yoke is formed integral with a cross-bar, C², having a screw-tapped central orifice, and with two depending legs arranged, respectively, on the ends of the screw tapped cross-bar, and each formed with a wedge-shaped lower extremity.

The disks are shaped at the back to hang closely to said wedge, and the wedge is preferably recessed at the sides to accommodate a corresponding projection, F, upon the back of the disks, so as to admit of slight rotary motion of the disks around the axis of the valve-stem, as is indicated by the sectional view in Fig. 5. This slight motion is to permit the disks to come to a proper bearing should the valve-seats be a little out of true.

Each disk D is provided with an ear, D', having a slot, d, through it, and the yoke C is provided with lugs c, which pass through the said slots and are afterward rivet-headed, to prevent the accidental displacement of the disks from the lugs in opening the valve or when the same is removed from the case.

The engagement of the lug c with the disk is very loose, so as to permit of slight rotation of the disk about the valve-stem, and to permit, also, of a slight vertical movement of the yoke with respect to the disk.

The operation of the device is as follows: When it is desired to close the valve, the valve-stem is turned, thus forcing the disks forward until they are exactly opposite the valve-seats A'. As soon as the disks reach this point they are prevented from coming any farther; but the loose connection between the lugs c and the slots d permits of the yoke C being driven slightly forward, and so firmly wedges the disks against the valve-seats.

It is thus seen that the mechanism is extremely simple and not liable to get out of order; that the disks, being firmly connected with the yoke, cannot become displaced as the valve is raised, and therefore the valve-case can be made perfectly free and open on the inside and not liable to become foul, so as to impair the action of the valve. The parts are also not liable to become loose when the valve mechanism is removed, nor to be improperly replaced in the case by an unskilled hand.

What we claim is—

In combination, the following elements: the yoke C, screw-tapped for the passage of the valve-stem, and provided with lugs c and a wedge-shaped extension, C', and disks D, provided with ears D' and slots d, said lugs slightly rivet-headed beyond the disks to prevent displacement, substantially as and for the purpose described.

In testimony whereof we sign this specification in the presence of two witnesses.

THADDEUS GALVIN.
JOHN GALVIN.

Witnesses:
N. S. WRIGHT,
M. B. O'DOGHERTY.